(12) United States Patent
Wolfson et al.

(10) Patent No.: US 11,341,099 B1
(45) Date of Patent: May 24, 2022

(54) DATA STORAGE AGNOSTIC DEDUPLICATION FOR VIRTUAL MACHINES

(71) Applicant: EMC IP Holding Company LLC, Hopkinton, MA (US)

(72) Inventors: Kfir Wolfson, Beer Sheva (IL); Jehuda Shemer, Kfar Saba (IL); Itay Azaria, Dimona (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 321 days.

(21) Appl. No.: 16/384,626

(22) Filed: Apr. 15, 2019

(51) Int. Cl.
  *G06F 16/174*    (2019.01)
  *G06F 16/188*    (2019.01)
  *G06F 16/13*     (2019.01)
  *G06F 9/455*     (2018.01)

(52) U.S. Cl.
  CPC ...... *G06F 16/1752* (2019.01); *G06F 9/45558* (2013.01); *G06F 16/137* (2019.01); *G06F 16/188* (2019.01); *G06F 2009/45583* (2013.01)

(58) Field of Classification Search
  CPC .. G06F 16/1752; G06F 16/137; G06F 16/188; G06F 9/45558; G06F 2009/45583
  See application file for complete search history.

(56) References Cited

U.S. PATENT DOCUMENTS

| | | | |
|---|---|---|---|
| 8,095,509 B2* | 1/2012 | Satya Sudhakar | G06F 16/1873 707/638 |
| 10,846,024 B2* | 11/2020 | Lakshman | G06F 3/0608 |
| 2013/0311739 A1* | 11/2013 | Kawakami | G06F 3/0683 711/165 |

* cited by examiner

*Primary Examiner* — Irete F Ehichioya
*Assistant Examiner* — Xiaoqin Hu
(74) *Attorney, Agent, or Firm* — Dergosits & Noah LLP; Todd A. Noah (57) ABSTRACT

Described is a system that provides deduplication management at a virtualization layer allowing virtual machines to store deduplicated data amongst various back-end data storage architectures. For example, the system may be storage-agnostic by operating at a hypervisor layer to fully leverage the benefits provided by virtualization. Accordingly, implementing deduplication by a hypervisor results in "pluggable" software-defined storage management. In addition, such a system may be implemented on any on-demand infrastructure (e.g. Infrastructure as a Service (IaaS)) environment that includes varying types of back-end storage solutions including solutions from various vendors. In addition, by operating within the virtualized layer of an on-demand computing resource environment (e.g. cloud environment), the system may provide deduplication across different resource clusters (e.g. hypervisor clusters) and environments. Moreover, the system may operate in a multitenancy environment to support global deduplication amongst multiple tenants, or tenant-specific deduplication.

20 Claims, 6 Drawing Sheets

DATA STORAGE AGNOSTIC DEDUPLICATION FOR VIRTUAL MACHINES

TECHNICAL FIELD

This disclosure relates to data deduplication, and more particularly, storage-agnostic data deduplication for virtual machines.

BACKGROUND

On-demand (e.g. cloud) computing resources often contain various types of hardware devices, servers, storage systems, networking devices, and software modules and components. Accordingly, on-demand computing providers often employ various virtualization technologies to coordinate and manage a diverse set of resources. For example, virtualization provides a layer of abstraction between computing, storage, and networking hardware of computing resources. In addition, as part of a storage system, on-demand computing resource providers often employ techniques to minimize storage overhead such as data deduplication. Traditionally, data deduplication management is implemented at a data storage layer, for example, at the physical disk level. Accordingly, the data deduplication infrastructure of traditional on-demand computing resources is not virtualization-aware, and thus, often fails to fully leverage aspects a virtualized environment. For example, virtualization within an on-demand infrastructure provides the ability to utilize different types of back-end data storage systems. Data deduplication implemented at the data storage layer, however, creates (potentially prohibitive) complexity, administrative burden, and a certain degree of inflexibility within an infrastructure that utilizes a diverse set of back-end data storage systems. Thus, there is a continued need to provide data deduplication components that fully leverage the advantages provided by a virtualized environment.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) that provides deduplication management at a virtualization layer allowing virtual machines to store deduplicated data amongst various back-end data storage architectures. For example, the system may be storage-agnostic by operating at a hypervisor layer to fully leverage the benefits provided by virtualization not previously available in traditional deduplication systems. For example, traditional deduplication is implemented at a storage layer (e.g. physical disk level), and therefore, configurations that include multiple back-end storage solutions (or vendors) require explicit support and coordination amongst each back-end component. As a result, if the underlying data associated with a virtual machine spanned multiple back-end storage types, deduplication between such data storages would be unavailable leading to data storage inefficiencies.

In contrast, systems described in some embodiments of the present disclosure overcome such limitations by providing deduplication management by a hypervisor (e.g. hypervisor I/O layer) that results in "pluggable" software-defined storage management. In addition, such a system may be implemented on any on-demand infrastructure (e.g. Infrastructure as a Service (IaaS)) environment that includes varying types of back-end storage solutions including solutions from various vendors. In addition, by operating within the virtualized layer of an on-demand computing resource environment (e.g. cloud environment), the system may provide deduplication across different resource clusters (e.g. hypervisor clusters) and environments. Moreover, the system may operate in a multitenancy environment to support global deduplication amongst multiple tenants, or tenant-specific deduplication.

In order to provide such an infrastructure, in some embodiments, the system may implement a local storage of a virtual machine as a metadata user volume. The metadata user volume may comprise an array of hash values for underlying data chunks that are stored by one or more separate back-end data storages. In addition, a hypervisor may intercept read and write requests of the virtual machine and perform specialized processing to store data in a deduplicated manner.

In a first aspect, the hypervisor may perform a specialized processing in response to intercepting a request to write data. For example, when intercepting a write request (or write I/O), the hypervisor may, for each data chunk in the write request, calculate a hash value (H) of the data chunk and write the hash value (H) to the metadata user volume 130. In addition, the system may determine whether the data chunk is already stored by the back-end storage system by searching for hash value (H) in a lookup map. If the data chunk is already stored, the system may forgo storing a duplicate copy of the data chunk. If, however, the data chunk is not already stored (e.g. a corresponding hash value entry does not exist within the lookup map), the hypervisor may select an available location within a particular back-end data storage and initiate writing the underlying data chunk to the particular back-end data storage. In addition, the hypervisor may then create an entry in the lookup map indicating that the particular data chunk is stored within the corresponding back-end data storage.

In a second aspect, the hypervisor may perform a specialized processing in response to intercepting a request to read data. For example, when intercepting a read request (or read I/O), the hypervisor may, for each data chunk in the read request, read (or calculate) the hash value (H) from the metadata user volume and perform a search (or lookup) of the hash value (H) in the lookup map. The hypervisor may then read (or obtain) the actual underlying data from the location (e.g. address, block, ID, etc.) and return it with the rest the data included in the initial read request to the virtual machine.

Thus, in some embodiments, described is a system that provides data management at a virtualization layer allowing virtual machines to store deduplicated data in a storage-agnostic manner.

In some embodiments, such a system may be provided within an operating environment. An example of such an operating environment is further described herein with reference to FIG. 1. However, in general, embodiments of the disclosure may include and/or be implemented in an operating environment including a cloud services (or on-demand services) environment that may be, or include, a data protection operating environment that includes a storage environment including primary storage and data protection storage. For example, at least some functionality may be provided by, or implemented in connection with, various platforms such as the Dell/EMC Data Domain™ data protection platform, and associated systems, methods, and components, although use of this particular platform is provided only by way of illustration and is not required.

In one embodiment, the storage environment may take the form of a cloud storage environment. However, embodiments of the disclosure may also be implemented for an on-premises storage environment, and hybrid storage environments that include public and private elements, as well as any other type of storage environment. In addition, any of these cloud environments, or other operating environments, may take the form of an operating environment that is partly, or completely, virtualized. The storage environment may include one or more host devices that each host one or more applications used by a client of the storage environment. As such, a particular client may employ, or otherwise be associated with, one or more instances of each of one or more applications. In general, the applications employed by the clients are not limited to any particular functionality or type of functionality.

Any of the devices, including the clients, servers and hosts, in the operating environment can take the form of software, physical machines, or virtual machines (VM), or any combination thereof, though no particular device implementation or configuration is required for any embodiment. Similarly, data protection system components such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

Figure 1:
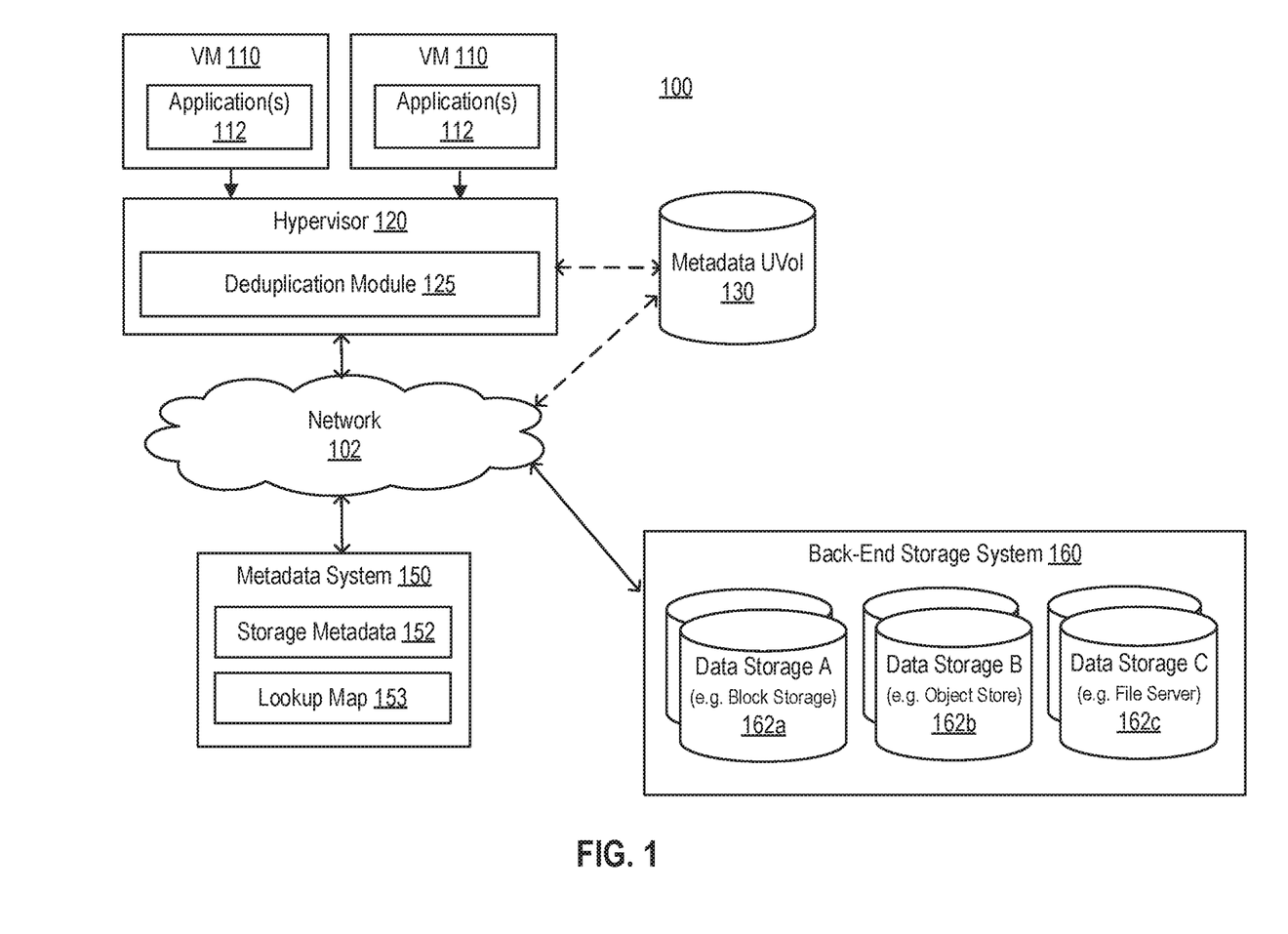
FIG. 1 is a block diagram illustrating an example of an operating environment for storing deduplicated data of a virtual machine amongst different back-end data storages according to one or more embodiments of the disclosure.

More specifically, and with reference to FIG. 1, shown is a block diagram illustrating an example of an operating environment 100 for storing deduplicated data of a virtual machine amongst different back-end data storages according to one or more embodiments of the disclosure.

As shown, the operating environment (or system) 100 may include one or more virtual machine(s) 110. In general, a Virtual Machine (VM) 110 may be a virtualization of underlying hardware and/or software and, as such, may include or otherwise be associated with various underlying components. A virtual machine 110 may host one or more applications 112, and may include local storage, as well as an interface for communicating with other systems and devices. Accordingly, the virtual machine 110 may act as a client or a host device. In general, an application 112 may create data to be stored by a virtual machine 110. For example, from the perspective of the application 112, data may be may be stored by a local storage (e.g. hard disk) of the virtual machine despite being physically stored on various back-end storage components as further described herein. As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In one embodiment, data may be stored as data chunks. For example, a data chunk may comprise a consecutive block of data having a fixed size. The fixed size may be a definable parameter based on a particular configuration (e.g. 8 KB, 16 KB, etc.).

In some embodiments, a virtual machine 110 may use virtual disks for their operating system, application software, and other data files. In some embodiments, a virtual disk may be stored as a virtual machine disk (VMDK) file. For example, the virtual disk may hide the physical storage layer from the virtual machine's operating system. In some embodiments, regardless of the type of back-end storage device employed by the on-demand system, the virtual disk may appear to the virtual machine as a local data storage. The local data storage may include any suitable type of storage such as a SCSI (Small Computer System Interface) device. In some embodiments, when a virtual machine communicates with its virtual disk, the virtual machine may issue appropriate I/O commands (e.g. SCSI commands). Because the underlying data may exist on different types of data storage types (e.g. data storage 162), these commands may be encapsulated into other forms, depending on the protocol a host uses to connect to the back-end storage system 160 (or physical storage device). Accordingly, to the applications and guest operating systems running on each virtual machine 110, the back-end storage system 160 appears as a local storage (e.g. one or more virtual SCSI disks).

Each of the virtual machines 110 may execute (or run) one or more hypervisors (or virtual machine monitors) 120. In some embodiments, the hypervisor 120 may create a software-virtualized representation of the on-demand computing resources upon which an operation system (OS) may be installed and virtualized for a virtual machine. Accordingly, the hypervisor 130 may allow multiple operating systems, which can include different operating systems or multiple instances of the same operating system, to share the same set of computing resources. In some embodiments, the hypervisor 120 may include a vSphere ESXi hypervisor provided by VMWare, which provides a virtualization layer that enables each server to host multiple secure and portable virtual machines running side by side on the same physical server sharing the physical server resources. In some embodiments, the hypervisor 120 may be installed on top of an operating system (e.g. host operating system), or may include operating system components such as a kernel. For example, in some embodiments, the hypervisor 120 may include a "bare-metal" hypervisor configuration.

As described, deduplication may be provided at a virtualization layer, and accordingly, the hypervisor 120 may include a deduplication module 125 to manage and store data of a virtual machine 110 in a deduplicated manner. In some embodiments, the data may include data that is to be stored by the virtual machine in a local storage. The local storage may include any storage associated with a virtual machine 110 such as a hard drive or disk drive (e.g. SCSI device). In addition, the deduplication module 125 may perform various processing to efficiently implement deduplication. For example, the deduplication module 125 may provide data segmentation, as well as in-flight encryption as the data is sent by virtual machine 110 to the back-end storage system 160. In some embodiments, the deduplication module 125 may be configured to store a backup data for the virtual machine that can be used to restore a virtual machine in the event of a loss of data. The term data backup is intended to be construed broadly and includes, but is not limited to, partial backups, incremental backups, full backups, clones, snapshots, any other type of copies of data, and any combination of the foregoing.

In some embodiments, the local storage (e.g. hard drive or hard disk) of a virtual machine 110 may be implemented as metadata user volume 130. The metadata user volume 130 may be a persistent storage that is implemented as references (e.g. pointers) to the underlying data. In some embodiments, the metadata user volume 130 may be implemented as a data structure of identifiers for the underlying data which may be stored separately in the back-end storage system 160. For example, the metadata user volume 130 may be implemented as an array of hash values of the underlying data (or data) that comprises the local storage of the virtual disk. For example, the underlying data may be stored separately from the metadata user volume 130 in the backend storage system 160. In addition, in some embodiments, the metadata user volume 130 may also be stored within the back-end storage system 160.

The system may also store various types of metadata, which in some embodiments, may be stored as part of a metadata system (or storage) 150. The metadata may also include storage metadata 152 such as file (or data) information (e.g. creation time, user or tenant information, security and access control attributes, etc.).

In some embodiments, data may be stored in segments (e.g. data chunks), and accordingly, a lookup map 153 (or chunk map, data map, storage map, index, etc.) may store location information of where the actual underlying data is stored within the back-end storage system 160. For example, the lookup map 153 may include an index of hash values (or other representation or identifier) of data chunks that are used as keys to identify a storage location (or data ID) of the underlying data within the back-end storage system 160.

The lookup map 153 may be implemented using any suitable structure. In some embodiments, the lookup map 153 may be implemented as a file system that catalogues data stored in the back-end storage system 160 as files. In some embodiments, data segments (e.g. data chunks) may be represented as files. For example, in some embodiments, the file system may store data in a hierarchical file structure to reduce search or lookup time required to locate a file that represents a data chunk. In one embodiment, the file structure may utilize the hash values representing a data chunk. For example, each hash entry (e.g. data chunk) may be a file and K prefix digits of the hash value may be used as a subdirectory. For example, if K=4, a hash value of 0001ab5f6 would result in a file named "ab5f62" in directory "0001" (e.g. path: /0001/ab5f62). In addition, additional subdirectory layers may also be added by splitting K=4 into K=2 and K=2, and thus, file "ab5f62" may be saved to directories "00" and "01" (e.g. path: /00/01/ab5f62). Such a structure may be expanded based on the application. The benefits of such a structure provides efficient storage consumption and supports enlargement of the file system. In addition, in some embodiments, the lookup map 153 may be implemented as a distributed expanded hash or a distributed hash table.

The back-end storage system 160 may store the underlying data of the virtual machines. For example, the back-end storage system 160 may include the components of a storage layer provided as part of the on-demand computing resources (e.g. IaaS). In some embodiments, the back-end storage system 160 may provide varying (or differing) types of data storage 162. In some embodiments, each data storage 162 (or data storage type) may employ a different storage architecture. For instance, as shown in this example, Data Storage A 162a may employ a block storage architecture, Data Storage B 162b may employ an object store architecture, and Data Storage C 162c may employ a file (or file server) architecture, although any other types of architectures and configurations are contemplated. A data storage implementing a block storage (or block level storage) architecture may include a Storage Area Network (SAN) system. For example, the SAN system may include one or more components (e.g. block devices) that are each a Logical Unit (LU) of a storage array. Accordingly, in some embodiments, a logical unit may be interpreted as a single device and may be identified by Logical Unit Number (LUN). Accordingly, the LUN may include a number used to identify a logical unit corresponding to a device that may be addressed by a SCSI or SAN protocol.

A data storage implementing an object storage (or object-based storage) architecture may include an architecture that manages data as objects. Accordingly, in some embodiments, each object may include data (e.g. underlying data, or the data itself) and may be associated with metadata, and a unique identifier (e.g. object ID).

A data storage implementing a file (or file level, or file server) architecture may include an architecture that includes a Network Attached Storage (NAS) system. In addition, the file storage may be configured using a storage protocol such as a Network File System (NFS), New Technology File System (NTFS), or Server Message Block (SMB) from Windows, or Virtual Machine File System (VMFS) from VMWare.

In some embodiments, each of the data storages 162 (e.g. 162a, 162b, 162c) may also be provided by different storage vendors (or entities), and accordingly, may employ various other variances such as different physical components and/or software components (e.g. APIs). However, as described, the data storage management (e.g. deduplication management) of embodiments of the disclosure may be provided at a virtualization layer (e.g. by the hypervisor) that provides a level of abstraction to allow a virtual machine to transparently store data in a deduplicated manner to any of these different data storage types. For example, as further described herein, the operating system (or applications 112) of the virtual machine may initiate I/O (e.g. reads/write) requests to store data on a local storage (e.g. hard drive or disk) of the virtual machine. In response, the hypervisor 120 may intercept or otherwise receive the such read/write requests to the local storage (e.g. native filesystem) and may redirect such requests (e.g. via an API or other remote call) to the back-end storage system 160 in a manner that is transparent to the virtual machine 110.

As described, in some embodiments, components of the back-end storage system 160 may be part of one or more physical servers that are provided as part of a cloud-computing service that is provided by a different entity than the entity that provides the virtual machines. For example, hypervisor 120 and virtual machines 110 may be provided as part of Dell/EMC Data Domain™ data protection platform and the data storage 162 (e.g. 162a, 162b, and/or 162c) may be provided by a different entity (e.g. Amazon Web Services (AWS) platform, Microsoft Azure platform, etc.). Accordingly, in some embodiments, the data storage 162 may be provided as part of a user or tenant account managed by the different entities (e.g. Amazon, Microsoft, etc.) and associated with the customer of the virtual machines 110. Accordingly, the system described herein may provide the customer with the ability to efficiently and seamlessly interact with the different entity that provides the data storage 162.

As shown, the components of operating environment 100 may interact via a network 102, which may be any type of wired or wireless network including a local area network (LAN), a wide area network (WAN), or a direct communication link, or other suitable connection.

In addition, it should be noted that in some embodiments, components of system 100 may represent one or more components of a Data Domain™ Restorer (DDR)-based deduplication storage system. For example, such components may utilize certain protocol-specific namespaces that are the external interface to applications and include NFS (network file system) and CIFS (common internet file system) namespaces, as well as DD Boost provided by Dell/EMC Corporation. In general, DD Boost (Data Domain Boost) is a system that distributes parts of the deduplication process to a server or application clients, enabling client-side deduplication for faster, more efficient backup and recovery. A data storage deployment may use any combination of these interfaces simultaneously to store and access data. Data Domain (DD) devices in system 100 may use the DD Boost backup protocol (e.g. file-oriented access protocol) to provide access from servers to DD devices.

Figure 2:
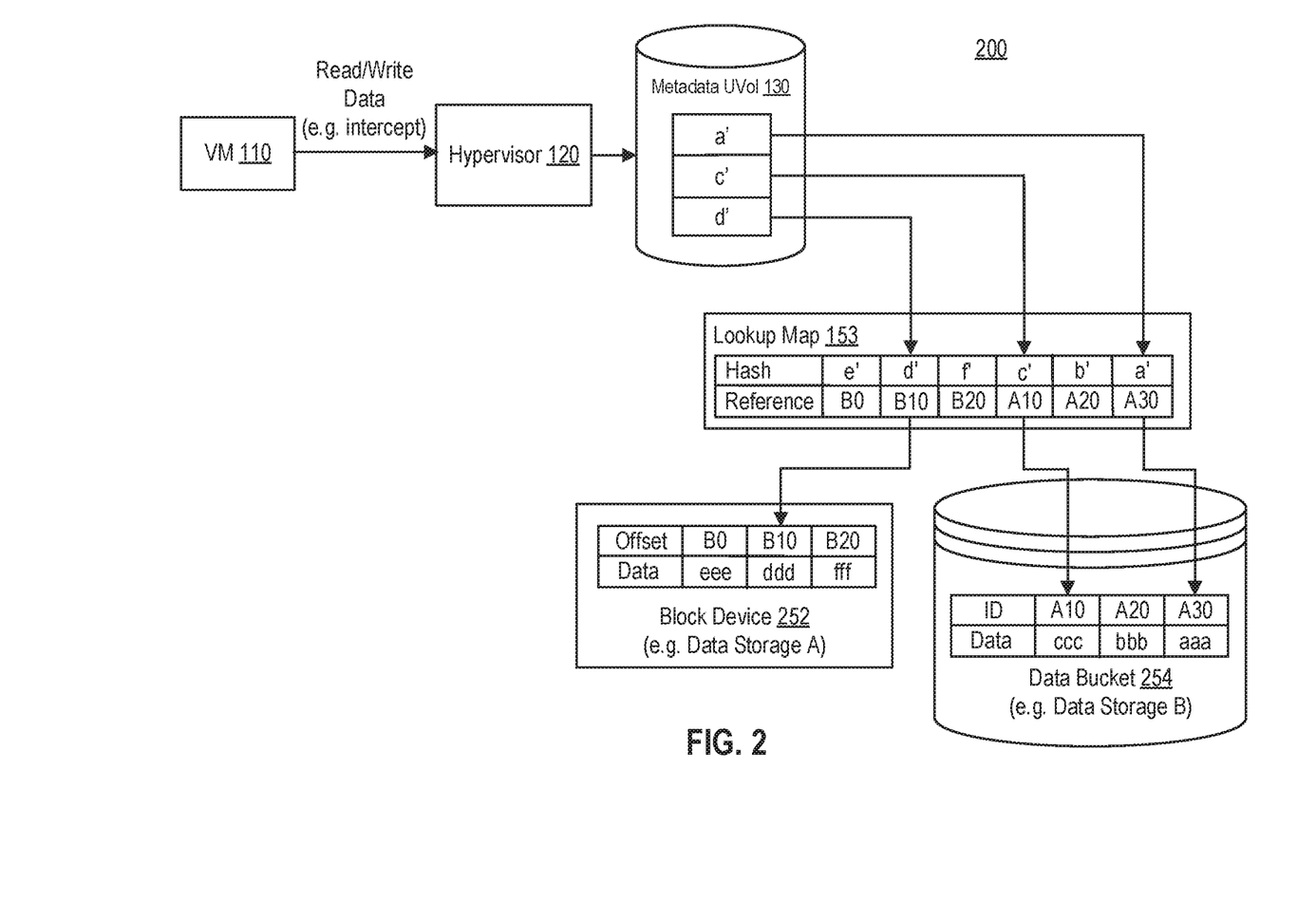
FIG. 2 is a diagram illustrating an example overview of the relationship between a metadata user volume and the underlying data of a virtual machine according to one or more embodiments of the disclosure.

As described, the system may implement a metadata user volume as part of managing deduplication amongst various type of storage types as further described in FIG. 2.

FIG. 2 is a diagram illustrating an example overview 200 of the relationship between a metadata user volume and the underlying data of a virtual machine according to one or more embodiments of the disclosure.

As shown, when a virtual machine (VM) 110 performs a read or write of data, the hypervisor 120 (or component of the hypervisor) may intercept the read or write request.

In some embodiments, when intercepting a read or write request, the system may utilize various software components including existing virtual layer software components. For example, hypervisor 120 may include the ability to insert an API or plugin into their I/O stack or storage virtualization stack. For example, ESXi hypervisor's provided by VMWare includes APIs such as the vSphere API for I/O Filtering ("VAIO") and the vSCSI Layer. Accordingly, the hypervisor (or related module such as the deduplication module) may utilize such an API (or other API) which is provided at a virtualization layer to intercept an I/O request. In addition, ESXi hypervisor's may include plugins such as Dell/EMC RecoveryPoint "VAIO splitter" and Dell/EMC RecoveryPoint "vSCSI splitter." In some instances, these splitters are utilized to perform on-the-fly, or real-time (or near real-time) replication of data. Again, such plugins are provided at the virtualization layer, and accordingly, utilizing such plugins by the hypervisor 120 allows deduplication management at the virtualization layer. Accordingly, in some embodiments, the hypervisor 120 may utilize existing software components (e.g. APIs, plugins, etc.) used for replication (or other services) to intercept read/write requests. Thus, the system may use these software components in conjunction with a metadata user volume 130 and a lookup map 153 to store underlying virtual machine data in varying data storage types as further described herein.

As shown in this example, the local storage (e.g. hard disk or drive) of the virtual machine 110 may store data chunks aaa, ccc, and ddd. Accordingly, the metadata user volume 130 may store a hash value for each of the data chunks (a', c', and d' respectively). In addition, the lookup map 153 may store an entry for each of the data chunks stored by the virtual machine. As shown, the lookup map 153 may store a list (or index) of hash values each associated with a reference indicating a storage location (e.g. address, offset, block, object ID, etc.) for the corresponding underlying data chunk. Accordingly, in this example, the lookup map 153 indicates that the data chunks corresponding to hash values a' and c' are stored in location (e.g. object ID) A30 and A10 respectively of data bucket 254. For example, the data bucket 254 may correspond to an object store architecture (e.g. Data Storage B 162b). Similarly, the lookup map 153 indicates that the data chunk corresponding to hash value d' is stored in location (e.g. offset, or block offset) B10 of block device 252. For example, the block device 252 may correspond to block storage architecture (e.g. Data Storage A 162a). As shown, the lookup map 153 may index underlying data chunks that are stored in different back-end data storage types. In some embodiments, the lookup map 153 may be shared (or accessed) by multiple virtual machines associated with different hypervisor clusters.

Accordingly, based on the configuration shown in diagram 200, the system may perform a particular process in response to intercepting a write or read request.

In one embodiment, when intercepting a write request (or write I/O), the system may, for each data chunk in the write request, calculate a hash value (H) of the data chunk. For example, the hash algorithm can be any suitable hashing algorithm such as an SHA hash value. Next, the system may write the hash value (H) to the metadata user volume 130 at a chunk offset. In addition, the system may determine whether the data chunk is already stored by the back-end storage system. Accordingly, the system may search for hash value (H) in the lookup map 153 to determine whether a particular data chunk is already stored by the back-end system. If the data chunk is not already stored (e.g. a corresponding hash value entry does not exist within the lookup map 153), the system may select an available location within a particular data storage type and initiate writing the underlying data chunk to the particular data storage type. In addition, the system may then create an entry in the lookup map 153 indicating that the particular data chunk is stored within the corresponding data storage type.

In one embodiment, when intercepting a read request (or read I/O), the system may, for each data chunk in the read request, read (or calculate) the hash value (H) from the metadata user volume 130 and perform a search (or lookup) of the hash value (H) in the lookup map 153. The system may then read (or obtain) the actual underlying data from the location (e.g. address, block, ID, etc.) and return it with the rest the data included in the initial read request to the virtual machine 110. In addition, in some embodiments, the system may also perform some form of garbage collection to remove all non-reference data chunks from the lookup map 153. As described, the system may perform specific processes in response to a virtual machine performing a read or write of data as further described in FIGS. 3-5.

Figure 3:
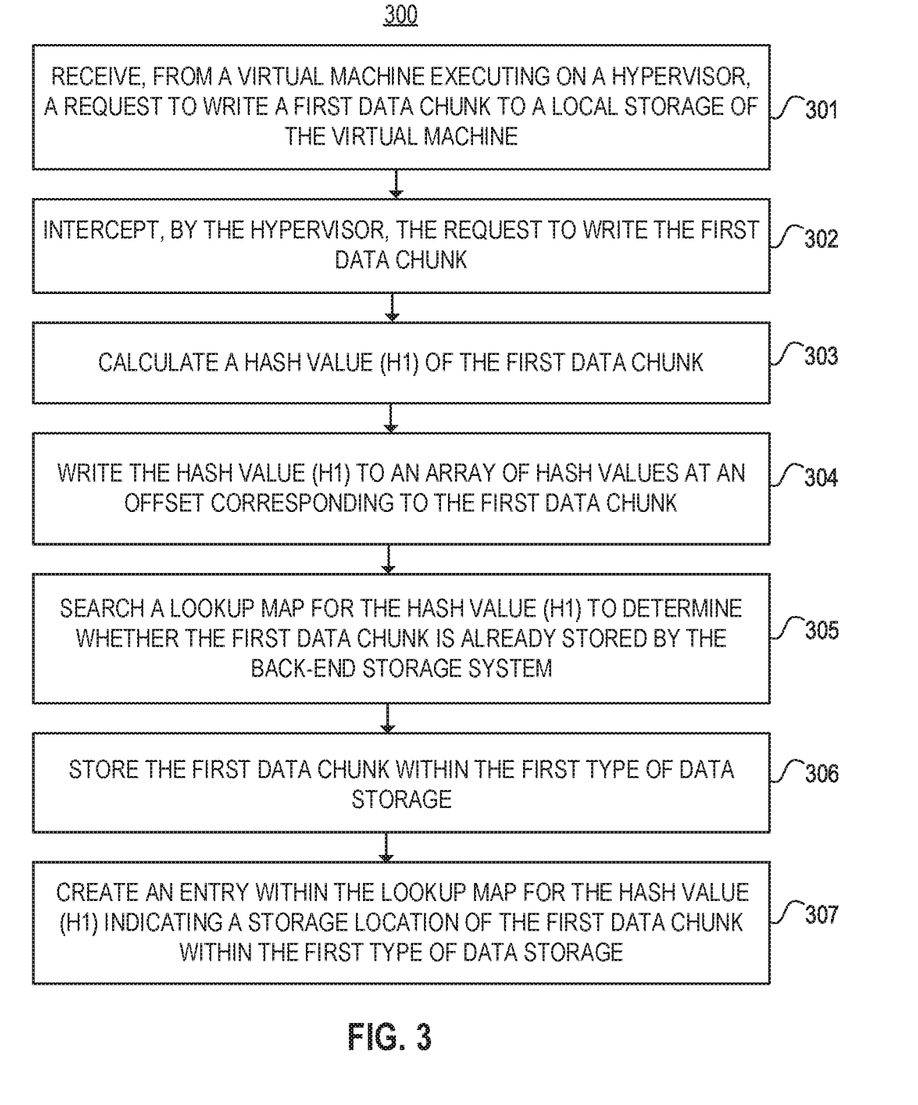
FIG. 3 is a flow diagram illustrating an example method of storing deduplicated data of a virtual machine according to one or more embodiments of the disclosure.

FIG. 3 is a flow diagram illustrating an example method of storing deduplicated data of a virtual machine according to one or more embodiments of the disclosure. Process 300 may use processing logic, which may include software, hardware, or a combination thereof. For example, process 300 may be performed by a system including one or more components described in operating environment 100 (e.g. system 100, hypervisor 120, deduplication module 125, etc.).

In 301, the system may receive a request to write a first data chunk to a local storage of the virtual machine (e.g. virtual machine 110). In one embodiment, the request to write a first data chunk to the local storage of the virtual machine may be from a virtual machine executing on a hypervisor (e.g. hypervisor 120). In addition, in one embodiment, the request to write the first data chunk may be from an application (e.g. application 112) executing on the virtual machine. In one embodiment, the local storage of the virtual machine may comprise a virtual hard disk. In one embodiment, the virtual hard disk may be implemented as an array of hash values (e.g. metadata user volume 130) for the underlying data chunks that are stored by a back-end storage system (e.g. back-end storage system 160). In one embodiment, the back-end storage system may include a first, second, and third type of data storage each comprising a different one of a block storage, an object storage, and a file storage. For example, the back-end storage system may include at least a first type of data storage (e.g. data storage 162a) and a second, different, type of data storage (e.g. data storage 162b), and a third type of data storage (e.g. data storage 162c), which is different than the first and second types of data storages. Accordingly, the system may include a plurality of different data storage types. In addition, in some embodiments, the data storages may include on-premises data storages and off-premises data storages simultaneously. For example, the system may include a first data storage as part of a server or system that is maintained by a first entity such as customer (or client), and at the same time the system may include a second data storage as part of a different server or system (e.g. remote from the first data storage) that may be maintained by a different entity (e.g. on-demand service or storage provider). In addition, the data storages may include data storages that are part of production (e.g. live) environment as well as a testing (or isolated, or failover, etc.) environment.

In 302, the system may intercept the request to write the first data chunk. In one embodiment, the hypervisor may intercept the write request. For example, the hypervisor may use a virtualization-layer API or plugin (or protocol, library, etc.) to intercept one or more requests to write the data chunks to the local storage of the virtual machine.

In 303, the system may calculate a hash value (H1) of the first data chunk. For example, the hash value may be calculated using a SHA hash algorithm. In 304, the system may write the hash value (H1) to the array of hash values at an offset corresponding to the first data chunk. As described, the system may store data in deduplicated manner, and accordingly, the system may determine whether the particular data chunk is already stored by the system. Accordingly, in 305, the system may search a lookup map (e.g. lookup map 153) for the hash value (H1) to determine whether the first data chunk is already stored by the back-end storage system. In some embodiments, the lookup map may comprise a hierarchal file system for the back-end storage system as described above. For example, the file system may use some or all of the hash value (e.g. H1) of a data chunk as a filename. In one embodiment, at least a portion (e.g. postfix or prefix) of the hash value (e.g. H1) may be used as a filename and at least one or more remaining portions (e.g. postfix or prefix) of the hash value (e.g. H1) may be used as one or more file directories as described above.

In 306, in response to determining the first data chunk is not already stored by the back-end storage system, the system may store the first data chunk within the first type of data storage. In addition, in 307, the system may create an entry within the lookup map for the hash value (H1) indicating a storage location of the first data chunk within the first type of data storage.

Figure 4:
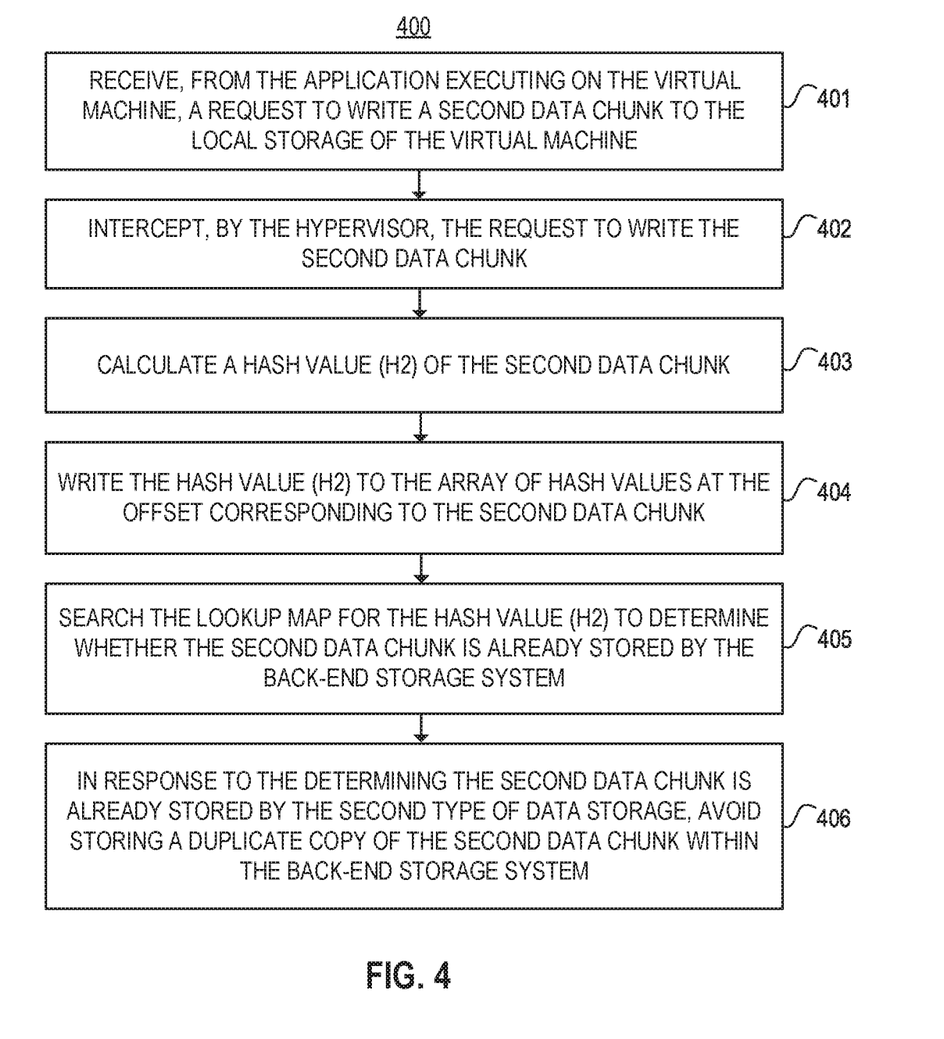
FIG. 4 is a flow diagram illustrating an example method of avoiding the storage of duplicate copies of data of a virtual machine according to one or more embodiments of the disclosure.

If the system determines that data chunk is already stored by the backend storage system, the system may forgo (or avoid) storing a duplicate copy of the data chunk as shown, for example, as described in the example process flow of FIG. 4.

FIG. 4 is a flow diagram illustrating an example method of avoiding the storage of duplicate copies of data of a virtual machine according to one or more embodiments of the disclosure. Process 400 may use processing logic, which may include software, hardware, or a combination thereof. For example, process 400 may be performed by a system including one or more components described in operating environment 100 (e.g. system 100, hypervisor 120, deduplication module 125, etc.).

In 401, the system receive, from the virtual machine executing on the hypervisor, a request to write a second data chunk to the local storage of the virtual machine. In one embodiment, the request to write the second data chunk may be from an application executing on the virtual machine. In 402, the system (e.g. hypervisor) may intercept the request to write the second data chunk. In 403, the system may calculate a hash value (H2) of the second data chunk. In 404, the system may write the hash value (H2) to the array of hash values at the offset corresponding to the second data chunk. In 405, the system may search the lookup map for the hash value (H2) to determine whether the second data chunk is already stored by the back-end storage system. For example, the lookup map may include an entry for the hash value (H2) indicating the storage location of the second data chunk is within the second type of data storage. Accordingly, the system may confirm the second data chunk is already stored by the second type of data storage. In one embodiment, determining the second data chunk is already stored by the second type of data storage may be performed exclusively by the hypervisor without accessing either of the first type of data storage and the second type of data storage. In other words, deduplication management such as maintaining the lookup map may be performed exclusively by the hypervisor. Moreover, storage-layer components of the back-end system may not be aware that data is stored in a deduplication manner as the management is performed by the hypervisor at a virtualization layer (or virtualization level of abstraction).

In response to determining the second data chunk is already stored by the second type of data storage, in 406, the system may avoid storing a duplicate copy of the second data chunk within the back-end storage system and thereby store the data in a deduplicated manner.

In one embodiment, the first type of data storage may comprise a block storage, and the second type of data storage may comprise an object store. Accordingly, the storage location of the first data chunk within the first type of data storage may comprise a data block offset or address, and the storage location of the second data chunk within the second type of data storage may comprise an object identifier.

Figure 5:
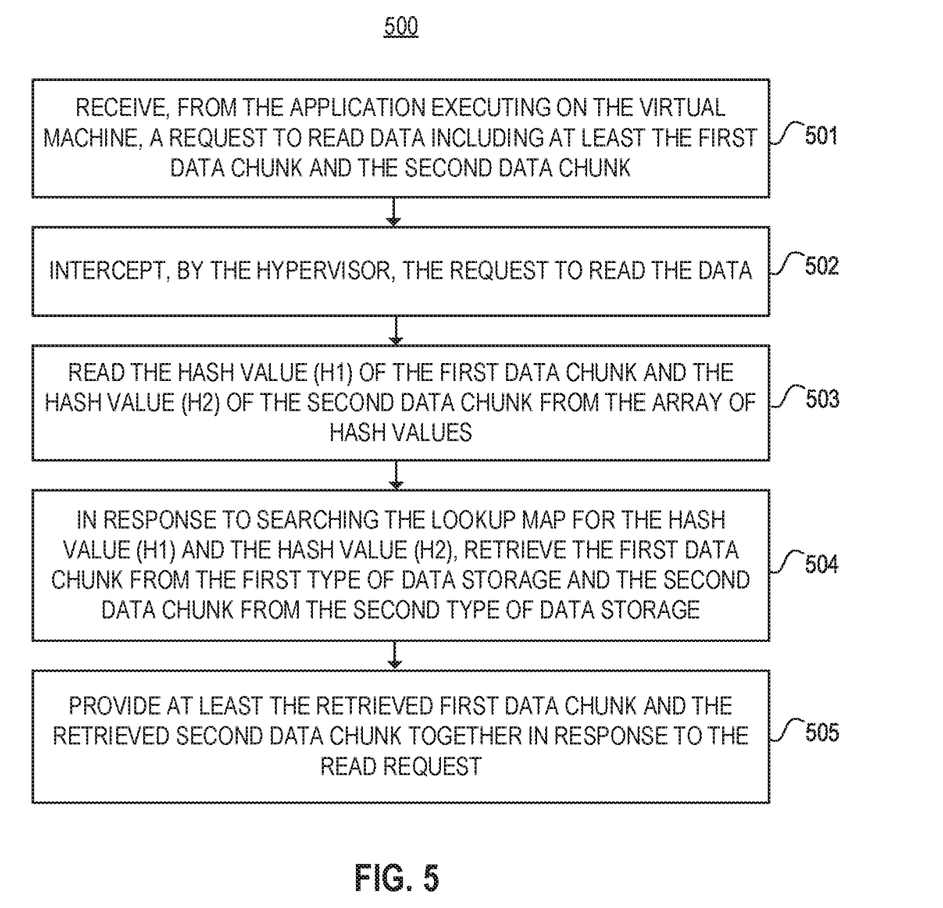
FIG. 5 is a flow diagram illustrating an example method of reading deduplicated data of a virtual machine according to one or more embodiments of the disclosure.

In addition, as part storing data in a deduplicated manner, the system may perform a process when reading data of a virtual machine as further described in FIG. 5.

FIG. 5 is a flow diagram illustrating an example method of reading deduplicated data of a virtual machine according to one or more embodiments of the disclosure. Process 500 may use processing logic, which may include software, hardware, or a combination thereof. For example, process 500 may be performed by a system including one or more components described in operating environment 100 (e.g. system 100, hypervisor 120, deduplication module 125, etc.).

In 501, the system may receive, from the virtual machine executing on the hypervisor, a request to read data including at least the first data chunk and the second data chunk. In one embodiment, the request to read data may be from an application executing on the virtual machine. In 502, the system (e.g. hypervisor) may intercept the request to read the data. In 503, the system may read the hash value (H1) of the first data chunk and the hash value (H2) of the second data chunk from the array of hash values. In response to searching the lookup map for the hash value (H1) and the hash value (H2), in 504, the system may retrieve the first data chunk from the first type of data storage and the second data chunk from the second type of data storage. In 505, the system may provide at least the retrieved first data chunk and the retrieved second data chunk together in response to the read request.

Accordingly, in some embodiments, described is a system that provides deduplication management at a virtualization layer allowing virtual machines to store deduplicated data amongst various back-end data storage types.

Figure 6:
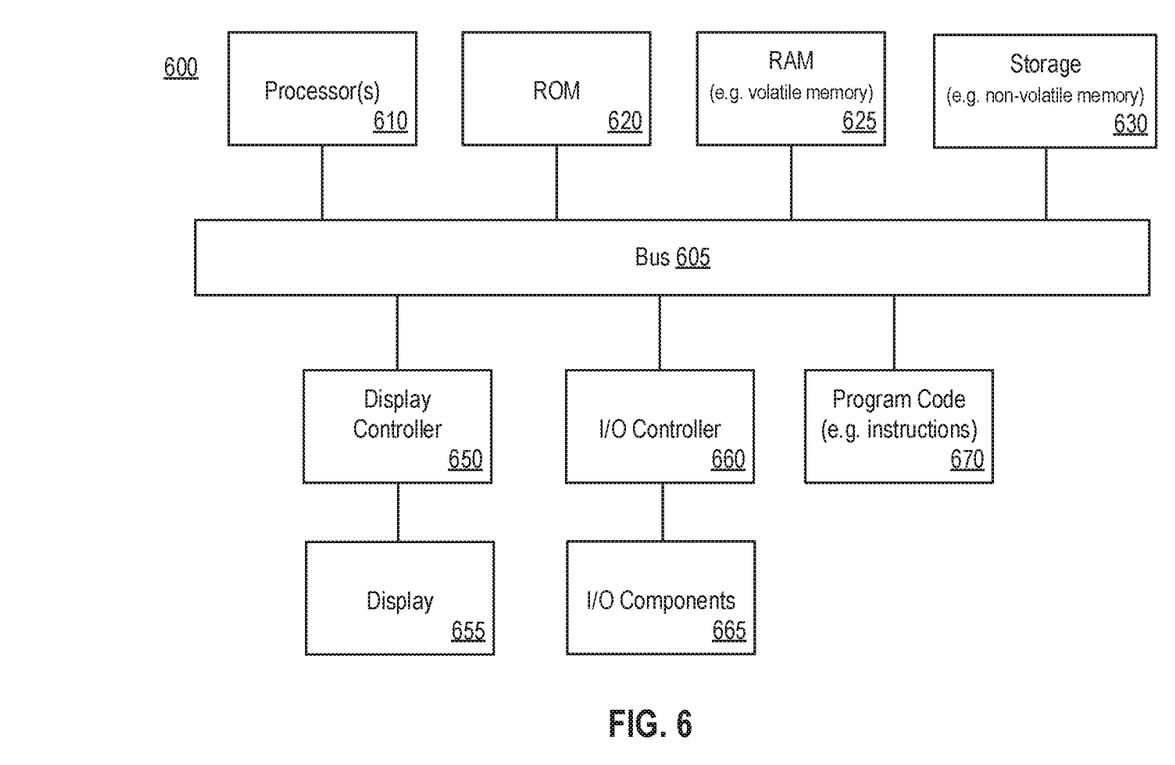
FIG. 6 is a block diagram illustrating an example of a computing system that may be used in conjunction with one or more embodiments of the disclosure.

FIG. 6 shows a block diagram of an example of a computing system that may be used in conjunction with one or more embodiments of the disclosure. For example, computing system 600 (or system, or server, or computing device, or device) may represent any of the devices or systems (e.g. system 100, on-demand computing resources, etc.) described herein that perform any of the processes, operations, or methods of the disclosure. Note that while the computing system 600 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 600 may include a bus 605 which may be coupled to a processor 610, ROM (Read Only Memory) 620, RAM (or volatile memory) 625, and storage (or non-volatile memory) 630. The processor(s) 610 may retrieve stored instructions from one or more of the memories 620, 625, and 630 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 610 may perform operations in an on-demand or "cloud computing" environment or as a service (e.g. within a "software as a service" (SaaS) implementation). Accordingly, the performance of operations may be distributed among the one or more processors 610, whether residing only within a single machine or deployed across a number of machines. For example, the one or more processors 610 may be located in a single geographic location (e.g. within a home environment, an office environment, or a server farm), or may be distributed across a number of geographic locations. The RAM 625 may be implemented as, for example, dynamic RAM (DRAM), or other types of memory that require power continually in order to refresh or maintain the data in the memory. Storage 630 may include, for example, magnetic, semiconductor, tape, optical, removable, non-removable, and other types of storage that maintain data even after power is removed from the system. It should be appreciated that storage 630 may be remote from the system (e.g. accessible via a network).

A display controller 650 may be coupled to the bus 605 in order to receive display data to be displayed on a display device 655, which can display any one of the user interface features or embodiments described herein and may be a local or a remote display device. The computing system 600 may also include one or more input/output (I/O) components 665 including mice, keyboards, touch screen, network interfaces, printers, speakers, and other devices. Typically, the input/output components 665 are coupled to the system through an input/output controller 660.

Program code 670 may represent any of the instructions, applications, software, libraries, toolkits, modules, components, engines, units, functions, logic, etc. as described herein (e.g. hypervisor 120, deduplication module 125, etc.). Program code 670 may reside, completely or at least partially, within the memories described herein (e.g. non-transitory computer-readable media), or within a processor during execution thereof by the computing system. Program code 670 may include both machine code, such as produced by a compiler, and files containing higher-level or intermediate code that may be executed by a computing system or other data processing apparatus (or machine) using an interpreter. In addition, program code 670 can be implemented as software, firmware, or functional circuitry within the computing system, or as combinations thereof. Program code 670 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that the term "approximately" or "substantially" may be used herein and may be interpreted as "as nearly as practicable," "within technical limitations," and the like. In addition, the use of the term "or" indicates an inclusive or (e.g. and/or) unless otherwise specified.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
   one or more processors; and
   a non-transitory computer readable medium storing a plurality of instructions, which when executed, cause the one or more processors to:
   receive, from a virtual machine executing on a hypervisor, a request to write a first data chunk to a local storage of the virtual machine, the local storage implemented as an array of hash values for underlying data chunks that are stored by a back-end storage system, the back-end storage system including at least a first type of data storage and a second type of data storage that is different from the first type, the local storage including hash values for underlying data chunks on both the first type of data storage and the second type of data storage;
   intercept, by the hypervisor, the request to write the first data chunk;
   calculate a hash value (H1) of the first data chunk;
   write the hash value (H1) to the array of hash values at an offset corresponding to the first data chunk;
   search a lookup map for the hash value (H1) to determine whether the first data chunk is already stored by the back-end storage system on either the first type of data storage or the second type of data storage; and
   in response to determining the first data chunk is not already stored by the back-end storage system:
   store the first data chunk within the first type of data storage; and
   create an entry within the lookup map for the hash value (H1) indicating a storage location of the first data chunk within the first type of data storage.

2. The system of claim 1, wherein the back-end storage system further includes a third type of data storage, and wherein the first, second, and third type of data storage each comprise a different one of a block storage, an object storage, and a file storage.

3. The system of claim 1, wherein the lookup map comprises a hierarchal file system for the back-end storage system using at least a portion of the hash value (H1) as a filename and at least one or more remaining portions of the hash value (H1) as one or more file directories.

4. The system of claim 1, wherein the plurality of instructions, when executed, further cause the one or more processors to:
   receive, from the virtual machine executing on the hypervisor, a request to write a second data chunk to the local storage of the virtual machine;
   intercept, by the hypervisor, the request to write the second data chunk;
   calculate a hash value (H2) of the second data chunk;
   write the hash value (H2) to the array of hash values at an offset corresponding to the second data chunk;
   search the lookup map for the hash value (H2) to determine whether the second data chunk is already stored by the back-end storage system, the lookup map including an entry for the hash value (H2) indicating the storage location of the second data chunk is within the second type of data storage; and
   in response to determining the second data chunk is already stored by the second type of data storage, avoid storing a duplicate copy of the second data chunk within the back-end storage system.

5. The system of claim 4, wherein determining the second data chunk is already stored by the second type of data storage is performed by the hypervisor without accessing either of the first type of data storage and the second type of data storage.

6. The system of claim 4, wherein the first type of data storage comprises a block storage, and the second type of data storage comprises an object store, and wherein the storage location of the first data chunk comprises a data block offset or block address, and the storage location of the second data chunk comprises an object identifier.

7. The system of claim 4, wherein the plurality of instructions, when executed, further cause the one or more processors to:
   receive, from the virtual machine executing on the hypervisor, a request to read data including at least the first data chunk and the second data chunk;
   intercept, by the hypervisor, the request to read the data;
   read the hash value (H1) of the first data chunk and the hash value (H2) of the second data chunk from the array of hash values;
   in response to searching the lookup map for the hash value (H1) and the hash value (H2), retrieving the first data chunk from the first type of data storage and the second data chunk from the second type of data storage; and
   provide at least the retrieved first data chunk and the retrieved second data chunk together in response to the read request.

8. The system of claim 1, wherein the hypervisor uses a virtualization-layer Application Programming Interface (API) to intercept one or more requests to write the underlying data chunks to the local storage of the virtual machine.

9. The system of claim 1, wherein one of the first and second type of data storage comprises an on-premises data storage, and one of the first and second type of data storage comprises an off-premises data storage.

10. A method comprising:
    receiving, from a virtual machine executing on a hypervisor, a request to write a first data chunk to a local storage of the virtual machine, the local storage implemented as an array of hash values for underlying data chunks that are stored by a back-end storage system, the back-end storage system including at least a first type of data storage and a second type of data storage that is different from the first type, the local storage including hash values for underlying data chunks on both the first type of data storage and the second type of data storage;
intercepting, by the hypervisor, the request to write the first data chunk;
calculating a hash value (H1) of the first data chunk;
writing the hash value (H1) to the array of hash values at an offset corresponding to the first data chunk;
searching a lookup map for the hash value (H1) to determine whether the first data chunk is already stored by the back-end storage system on either the first type of data storage or the second type of data storage; and
in response to determining the first data chunk is not already stored by the back-end storage system:
storing the first data chunk within the first type of data storage; and
creating an entry within the lookup map for the hash value (H1) indicating a storage location of the first data chunk within the first type of data storage.

11. The method of claim 10, wherein the lookup map comprises a hierarchal file system for the back-end storage system using at least a portion of the hash value (H1) as a filename and at least one or more remaining portions of the hash value (H1) as one or more file directories.

12. The method of claim 10, further comprising:
receiving, from the virtual machine executing on the hypervisor, a request to write a second data chunk to the local storage of the virtual machine;
intercepting, by the hypervisor, the request to write the second data chunk;
calculating a hash value (H2) of the second data chunk;
writing the hash value (H2) to the array of hash values at an offset corresponding to the second data chunk;
searching the lookup map for the hash value (H2) to determine whether the second data chunk is already stored by the back-end storage system, the lookup map including an entry for the hash value (H2) indicating the storage location of the second data chunk is within the second type of data storage; and
in response to determining the second data chunk is already stored by the second type of data storage, avoid storing a duplicate copy of the second data chunk within the back-end storage system.

13. The method of claim 12, wherein determining the second data chunk is already stored by the second type of data storage is performed by the hypervisor without accessing either of the first type of data storage and the second type of data storage.

14. The method of claim 12, wherein the first type of data storage comprises a block storage, and the second type of data storage comprises an object store, and wherein the storage location of the first data chunk comprises a data block offset or block address, and the storage location of the second data chunk comprises an object identifier.

15. The method of claim 12, further comprising:
receiving, from the virtual machine executing on the hypervisor, a request to read data including at least the first data chunk and the second data chunk;
intercepting, by the hypervisor, the request to read the data;
read the hash value (H1) of the first data chunk and the hash value (H2) of the second data chunk from the array of hash values;
in response to searching the lookup map for the hash value (H1) and the hash value (H2), retrieving the first data chunk from the first type of data storage and the second data chunk from the second type of data storage; and
providing at least the retrieved first data chunk and the retrieved second data chunk together in response to the read request.

16. A computer program product comprising a non-transitory computer-readable medium having a computer-readable program code embodied therein to be executed by one or more processors, the program code including instructions to:
receive, from a virtual machine executing on a hypervisor, a request to write a first data chunk to a local storage of the virtual machine, the local storage implemented as an array of hash values for underlying data chunks that are stored by a back-end storage system, the back-end storage system including at least a first type of data storage and a second type of data storage that is different from the first type, the local storage including hash values for underlying data chunks on both the first type of data storage and the second type of data storage;
intercept, by the hypervisor, the request to write the first data chunk;
calculate a hash value (H1) of the first data chunk;
write the hash value (H1) to the array of hash values at an offset corresponding to the first data chunk;
search a lookup map for the hash value (H1) to determine whether the first data chunk is already stored by the back-end storage system on either the first type of data storage or the second type of data storage; and
in response to determining the first data chunk is not already stored by the back-end storage system:
store the first data chunk within the first type of data storage; and
create an entry within the lookup map for the hash value (H1) indicating a storage location of the first data chunk within the first type of data storage.

17. The computer program product of claim 16, wherein the computer-readable program code includes further instructions to:
receive, from the virtual machine executing on the hypervisor, a request to write a second data chunk to the local storage of the virtual machine;
intercept, by the hypervisor, the request to write the second data chunk;
calculate a hash value (H2) of the second data chunk;
write the hash value (H2) to the array of hash values at an offset corresponding to the second data chunk;
search the lookup map for the hash value (H2) to determine whether the second data chunk is already stored by the back-end storage system, the lookup map including an entry for the hash value (H2) indicating the storage location of the second data chunk is within the second type of data storage; and
in response to determining the second data chunk is already stored by the second type of data storage, avoid storing a duplicate copy of the second data chunk within the back-end storage system.

18. The computer program product of claim 17, wherein determining the second data chunk is already stored by the second type of data storage is performed by the hypervisor without accessing either of the first type of data storage and the second type of data storage.

19. The computer program product of claim 17, wherein the first type of data storage comprises a block storage, and the second type of data storage comprises an object store, and wherein the storage location of the first data chunk comprises a data block offset or block address, and the storage location of the second data chunk comprises an object identifier.

20. The computer program product of claim 17, wherein the computer-readable program code includes further instructions to:

receive, from the virtual machine executing on the hypervisor, a request to read data including at least the first data chunk and the second data chunk;

intercept, by the hypervisor, the request to read the data;

read the hash value (H1) of the first data chunk and the hash value (H2) of the second data chunk from the array of hash values;

in response to searching the lookup map for the hash value (H1) and the hash value (H2), retrieving the first data chunk from the first type of data storage and the second data chunk from the second type of data storage; and provide at least the retrieved first data chunk and the retrieved second data chunk together in response to the read request.

\* \* \* \* \*